(12) United States Patent
Lees

(10) Patent No.: US 9,981,191 B2
(45) Date of Patent: May 29, 2018

(54) NATIVE GAMEPLAY EXPERIENCE ACROSS PLATFORMS

(71) Applicant: Google Inc., Mountain View, CA (US)

(72) Inventor: Jennifer Anne Lees, Mountain View, CA (US)

(73) Assignee: Google LLC, Mountain View, CA (US)

( * ) Notice: Subject to any disclaimer, the term of this patent is extended or adjusted under 35 U.S.C. 154(b) by 352 days.

(21) Appl. No.: 14/048,424

(22) Filed: Oct. 8, 2013

(65) Prior Publication Data

US 2015/0099587 A1    Apr. 9, 2015

(51) Int. Cl.
*A63F 13/77* (2014.01)
*A63F 13/33* (2014.01)

(52) U.S. Cl.
CPC ............ *A63F 13/77* (2014.09); *A63F 13/33* (2014.09); *A63F 2300/209* (2013.01)

(58) Field of Classification Search
CPC ...................................................... A63F 13/12
See application file for complete search history.

(56) References Cited

U.S. PATENT DOCUMENTS

| 8,187,104 | B2 | 5/2012 | Pearce | |
| 8,775,678 | B1* | 7/2014 | Cooley | G06F 17/30179 709/248 |
| 2006/0030408 | A1* | 2/2006 | Kiiskinen | A63F 13/12 463/42 |
| 2008/0139301 | A1* | 6/2008 | Holthe | A63F 13/00 463/25 |
| 2010/0173712 | A1* | 7/2010 | Buhr | A63F 13/795 463/472 |
| 2010/0217802 | A1 | 8/2010 | Rubio Andres et al. | |
| 2011/0010699 | A1* | 1/2011 | Cooper | G06F 21/12 717/169 |
| 2011/0093567 | A1* | 4/2011 | Jeon | G06F 9/5072 709/219 |
| 2011/0225640 | A1* | 9/2011 | Ganapathy et al. | 726/8 |
| 2012/0021829 | A1 | 1/2012 | Shoham et al. | |
| 2012/0079095 | A1* | 3/2012 | Evans et al. | 709/224 |
| 2012/0079126 | A1* | 3/2012 | Evans et al. | 709/230 |
| 2012/0203862 | A1* | 8/2012 | Tayeb | G06F 8/61 709/217 |
| 2012/0278439 | A1* | 11/2012 | Ahiska | H04L 67/2852 709/218 |

(Continued)

FOREIGN PATENT DOCUMENTS

WO    2011031761    3/2011

*Primary Examiner* — Omkar Deodhar
*Assistant Examiner* — Shauna-Kay Hall
(74) *Attorney, Agent, or Firm* — Shumaker & Sieffert, P.A.

(57) ABSTRACT

An operating system (OS) platform-level gaming module that is integrated as part of an OS platform for a first wired and/or wireless communication device is operable to detect when a user installs a game written for the first wired and/or wireless communication device. The OS platform-level gaming module is operable to publish the game to a cloud when the installation of the game is detected and install the published game to at least a second wired and/or wireless communication device that is associated with said user. The OS platform-level gaming module may be operable to copy corresponding configurations and settings for the game installed on the first wired and/or wireless communication device to the cloud.

19 Claims, 4 Drawing Sheets

(56) References Cited

U.S. PATENT DOCUMENTS

| | | | | |
|---|---|---|---|---|
| 2012/0287343 | A1* | 11/2012 | Kelly | G06F 3/1438 |
| | | | | 348/554 |
| 2013/0007203 | A1* | 1/2013 | Szu | H04W 4/00 |
| | | | | 709/217 |
| 2013/0086114 | A1* | 4/2013 | Wilson | G06F 17/30575 |
| | | | | 707/783 |
| 2014/0095624 | A1* | 4/2014 | Quan | G06F 17/30085 |
| | | | | 709/205 |
| 2014/0170978 | A1* | 6/2014 | Wolman | G06F 9/54 |
| | | | | 455/41.2 |
| 2014/0359602 | A1* | 12/2014 | Sawaya | G06F 8/62 |
| | | | | 717/176 |

\* cited by examiner

NATIVE GAMEPLAY EXPERIENCE ACROSS PLATFORMS

CROSS-REFERENCE TO RELATED APPLICATIONS/INCORPORATION BY REFERENCE

Not Applicable.

FIELD

Certain embodiments of the disclosure relate to communication. More specifically, certain embodiments of the disclosure relate to a method and system for context sensitive native gameplay experience across mobile and connected platforms.

BACKGROUND

In conventional systems, game developers have to create multiple versions of a native gameplay experience for stand-alone contexts on devices such as mobile and tablet play, web browser embedding, TV connections and desktop software. Furthermore, as a user transitions among a plurality of devices, the user has to manually switch to a preferred one of the plurality of devices and load the game.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for context sensitive native gameplay experience across mobile and connected platforms, substantially as shown in and/or described in connection with at least one of the figures, as set forth more completely in the claims.

These and other advantages, aspects and novel modules of the present disclosure, as well as details of an illustrated embodiment thereof, will be more fully understood from the following description and drawings.

DETAILED DESCRIPTION

Figure 1:
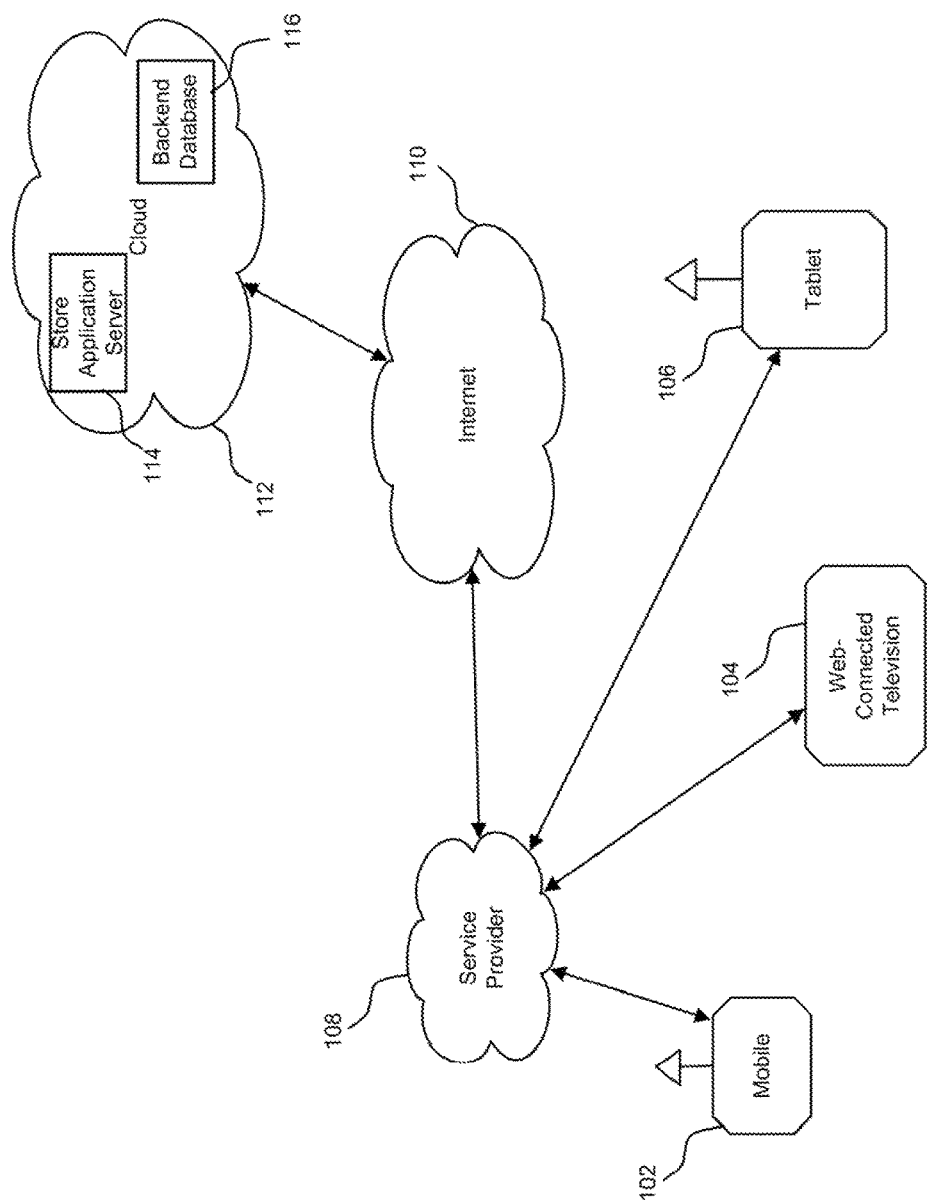
FIG. 1 is a block diagram of an example system for providing context sensitive native gameplay experience across mobile and connected platforms, in accordance with an embodiment of the disclosure.

Certain embodiments of the disclosure may be found in a method and system for context sensitive native gameplay experience across mobile and connected platforms. In various embodiments of the disclosure, an operating system (OS) platform-level gaming module or feature that is integrated as part of an operating system platform for a first wired and/or wireless communication device is operable to detect when a user installs a game written for the first wired and/or wireless communication device. The operating system platform-level gaming module is operable to publish the game and/or notification of an install event to a Cloud when the installation of the game is detected. The operating system platform-level gaming module enables installation of the published game to at least a second wired and/or wireless communication device that is associated with the user.

The operating system platform-level gaming module may be operable to copy corresponding configurations and settings for the game installed on the first wired and/or wireless communication device to the Cloud. The operating system platform-level gaming module may be operable to update the copied corresponding configurations and settings for the game whenever there is a change to one or more of the corresponding configurations and settings for the game installed on the first wired and/or wireless communication device to the Cloud. The operating system platform-level gaming module may be operable to generate one or more methods that enable conversion of corresponding content for the game to one or more different resolutions compatible with the first wired and/or wireless communication device and at least the second wired and/or wireless communication device. The one or more different resolutions include visual resolution such as display resolution and/or audio content resolution such as different bit rates or formats.

The operating system platform-level gaming module may be operable to generate one or more methods that enable normalization of input for controlling the game on the first wired and/or wireless communication device and at least the second wired and/or wireless communication device. The operating system platform-level gaming module may be operable to save, in a serialized format, gameplay data associated with playing of the game on the first wired and/or wireless communication device. The saving may occur on one or both of the first wired and/or wireless communication device and/or may occur remotely in the Cloud. The operating system platform-level gaming module may be operable to communicate the gameplay data from one or both of the Cloud and the first wired and/or wireless communication device to at least the second wired and/or wireless communication device that is associated with the user.

The operating system platform-level gaming module may be operable to record at least a portion of one or both of finished and unfinished gameplay sessions for the game. When the game is running on the first wired and/or wireless communication device and the first wired and/or wireless communication device comes within operating range of the second wired and/or wireless communication device, an operating system platform-level gaming module or feature on the second wired and/or wireless communication device may be operable to cause the of transfer gameplay configurations and settings, which typically include the recorded gameplay sessions, to the second wired and/or wireless communication device.

FIG. 1 is a block diagram of an example system for providing context sensitive native gameplay experience across mobile and connected platforms, in accordance with an embodiment of the disclosure. Referring to FIG. 1, there is shown a mobile communication device 102, a web-connected television 104, a tablet 106, a service provider 108, the Internet 110, and a Cloud 112, store application server 114 and backend database 116.

The mobile communication device 102 may include suitable logic, circuitry, interfaces and/or code that may be operable to provide communication and to engage in the playing of games. The mobile communication device 102 may receive communication services via the service provider 108. The mobile communication device 102 may include an operating system platform that includes integrated capability to provide context sensitive native gameplay experience across mobile and connected platforms, which includes the communication device 102, the web-connected television 104, and the tablet 106.

In accordance with various embodiments of the disclosure, the operating system platform includes a platform-level module that enables a user of the mobile communication device 102 to publish a game, written for a first device, to the Cloud 112, such that when the user installs the game on the first device, it is also compatibly installed to the one or more other devices. In other words, the operating system platform includes a platform-level module that enables a user of the mobile communication device 102 to publish a game, written for the mobile communication device 102, to the Cloud 112. Thus, when the user installs the game on the mobile communication device 102, the game is also compatibly installed to a web-connected television 104, and the tablet 106.

Alternatively or in addition, the first device may provide the install event for the game to the Cloud 112, which then may be provided to other devices such as the web-connected television 104 and/or the table 106. Upon receipt or notification of the install event, another device such as the television 104 or table 106 may install or otherwise receive the game. The game then may be compatibly installed to the other device. Such a configuration may be relatively more efficient, since the initial game install may originate with a remote source, such as a Cloud 112 or application server 114.

Compatibility installed means that the game is installed on each of the web-connected television 104, and the tablet 106 to match their corresponding unique modules and/or capabilities. For example, if the web connected television 104 includes the capability to handle 3D video and 3D audio, then corresponding video and audio content for the game for the web-connected television 104 may include 3D video and 3D audio, respectively. If the tablet 106 is a 10-inch Android-based tablet, then the audio content for the game may be formatted to fit on the 10-inch screen of the tablet 106. In accordance with various embodiments of the disclosure, the capability of the web-connected television 104 to provide context sensitive native gameplay experience across mobile and connected platforms is a platform-level module or feature that is integrated into the operating system platform and is not an application that runs on the operating system.

The web-connected television 104 may include suitable logic, circuitry, interfaces and/or code that may be operable to receive traditional television services as well as communicate via the Internet 110 and engage in the playing of single player and multiplayer games. In accordance with various embodiments of the disclosure, the web-connected television 104 may include an operating system platform that includes integrated capability to provide context sensitive native gameplay experience across mobile and connected platforms, which includes the web-connected television 104, the communication device 102, and the tablet 106. In accordance with various embodiments of the disclosure, the operating system platform of the web-connected television 104 includes a platform-level module that enables a user of web-connected television 104 to publish a game, which is written for a first device, to the Cloud 112, such that when the user installs the game on the first device, it is also compatibly installed to the one or more other devices. In other words, the operating system platform of the web-connected television 104 includes a platform-level module that enables a user of the web-connected television 104 to publish a game, which is written for the web-connected television 104, to the Cloud 112, such that when the user installs the game on the web-connected television 104, the game is also compatibly installed the mobile communication device 102, and the tablet 106. Compatibility installed means that the game is installed on each of the mobile communication device 102 and the tablet 106 to match their corresponding unique modules and/or capabilities. For example, if the mobile communication device 102 is a smartphone, then the game content for the smartphone is formatted utilizing the appropriate video and audio codecs suitable for playback on the smartphone. If the tablet 106 is a 10-inch Android-based tablet, then the audio content for the game may be formatted to fit on the 10-inch screen of the tablet 106. In accordance with various embodiments of the disclosure, the capability of the web-connected television 104 to provide context sensitive native gameplay experience across mobile and connected platforms is a platform-level module that is integrated into the operating system platform and is not an application that runs on the operating system.

The tablet 106 may include suitable logic, circuitry, interfaces and/or code that may be operable to receive traditional television services as well as communicate via the Internet 110 and engage in the playing of single player and multiplayer games. In accordance with various embodiments of the disclosure, the tablet 106 may include an operating system platform that includes integrated capability to provide context sensitive native gameplay experience across mobile and connected platforms, which includes the web-connected television 104, the communication device 102, and the tablet 106. In accordance with various embodiments of the disclosure, the operating system platform of the tablet 106 includes a platform-level module that enables a user of the tablet 106 to publish a game, which is written for a first device, to the Cloud 112, such that when the user installs the game on the first device, it is also compatibly installed to the one or more other devices. In other words, the operating system platform of the tablet 106 includes a platform-level module that enables a user of the tablet 106 to publish a game, which is written for the tablet 106, to the Cloud 112, such that when the user installs the game on the tablet 106, the game is also compatibly installed the mobile communication device 102, and the tablet 106. Compatibility installed means that the game is installed on each of the mobile communication device 102 and the web-connected television 104 to match their corresponding unique modules and/or capabilities. For example, if the web connected television 104 includes the capability to handle 3D video and 3D audio, then the video and audio content for the game for the web-connected television 104 may include 3D video and 3D audio, respectively. If the communication device 102 is a smartphone, then the game content for the smartphone is formatted utilizing the appropriate video and audio codecs suitable for playback on the smartphone. In accordance with various embodiments of the disclosure, the capability of the web-connected television 104 to provide context sensitive native gameplay experience across mobile and connected platforms is a platform-level module that is integrated into the operating system platform and is not an application that runs on the operating system.

The service provider 108 may include suitable devices and interfaces that may be operable to provide Internet based services to various communication devices. In this regard, the service provider 108 may provide services to the various communication devices using a wired and/or a wireless communication medium. For example, the service provider 108 may provide Internet services to each of the mobile communication device 102 and the tablet 106 utilizing wireless technologies. The service provider 108 may provide Internet services to the web-connected television utilizing a wired and/or wireless medium. The service provider 108 may include a cellular, satellite, cable or DSL service provider.

The Internet 110 may include suitable devices and interfaces that enable interconnectivity and communication amongst a network of computers, communication devices and servers. The service provider 108 may be operable to provide service to the Internet 110 for each of the mobile communication devices 102, the web-connected television 104 and the tablet 106. The Internet 110 and the Cloud 112 may host one or more application servers and/or game servers that may enable users of the mobile device 102, the web-connected television 104 and the tablet 106 to play single player as well as multiplayer games.

The Cloud 112 may host one or more game servers that may enable users of the mobile device 102, the web-connected television 104 and the tablet 106 to play single player as well as multiplayer games. The Cloud 112 may host the store application server 114 and the backend database 116. The Cloud 112 may be accessible to the mobile device 102 and the web-connected television 104 via the Internet 110.

The store application server 114 may include suitable logic, circuitry, interfaces and/or code that may be operable to serve and/or store applications and/or video game related information. In an embodiment of the disclosure, the store application server 114 may be operable to store accounting as well corresponding game and application information for users. The store application server 114, which may be located in the Cloud 112, may track the games purchased by a particular user to enable subsequent installation of the game on a particular device or other devices utilized by the user.

The backend database 116 may include suitable logic, circuitry, interfaces and/or code that may be operable to receive and store gameplay activity associated with playing of a game on the mobile communication device 102, the web-connected television 104 or the tablet 106. In this regard, the platform-level module of each of the operating system platform of the mobile communication device 102, the web-connected television 104 and the tablet 106 may be operable to periodically or aperiodically upload gameplay activity to the backend database 116. Accordingly, when gameplay is transferred from one of the mobile communication device 102, the web-connected television 104 or the tablet 106 to another of the mobile communication device 102, the web-connected television 104 or the tablet 106, the device to which the gameplay has been transferred will have the latest up-to-date information on the gameplay.

In operation, whenever a game is installed on one of the mobile communication device 102, the web-connected television 104 and the tablet 106, the operating system platform on which the game is installed is operable to publish the game to the Cloud 112. As a result of the publication to the Cloud 112, the game is also compatibly installed on remaining ones of the mobile communication device 102, the web-connected television 104 and the tablet 106. During a gameplay session on any of the mobile communication device 102, the web-connected television 104 and the tablet 106, the corresponding operating system platform is operable to upload and store gameplay data for the current gameplay session to the backend database 116. Accordingly, when the device on which current gameplay session is occurring comes within connection range of another one (new) of the mobile communication device 102, the web-connected television 104 and the tablet 106, gameplay data for the current gameplay session may be transparently transferred from the device on which gameplay session is occurring and/or from the backend database 116 to the new one of the mobile communication device 102, the web-connected television 104 and the tablet 106. In this regard, the new one of the mobile communication device 102, the web-connected television 104 and the tablet 106 may seamlessly continue with the current gameplay session. A connection range may refer to, or be selected based upon, a predetermined distance that is within the communication capabilities of the connecting devices. In some configurations, the connection range may be relatively short for human proximity, such as 10, 15, or 20 meters.

Figure 2:
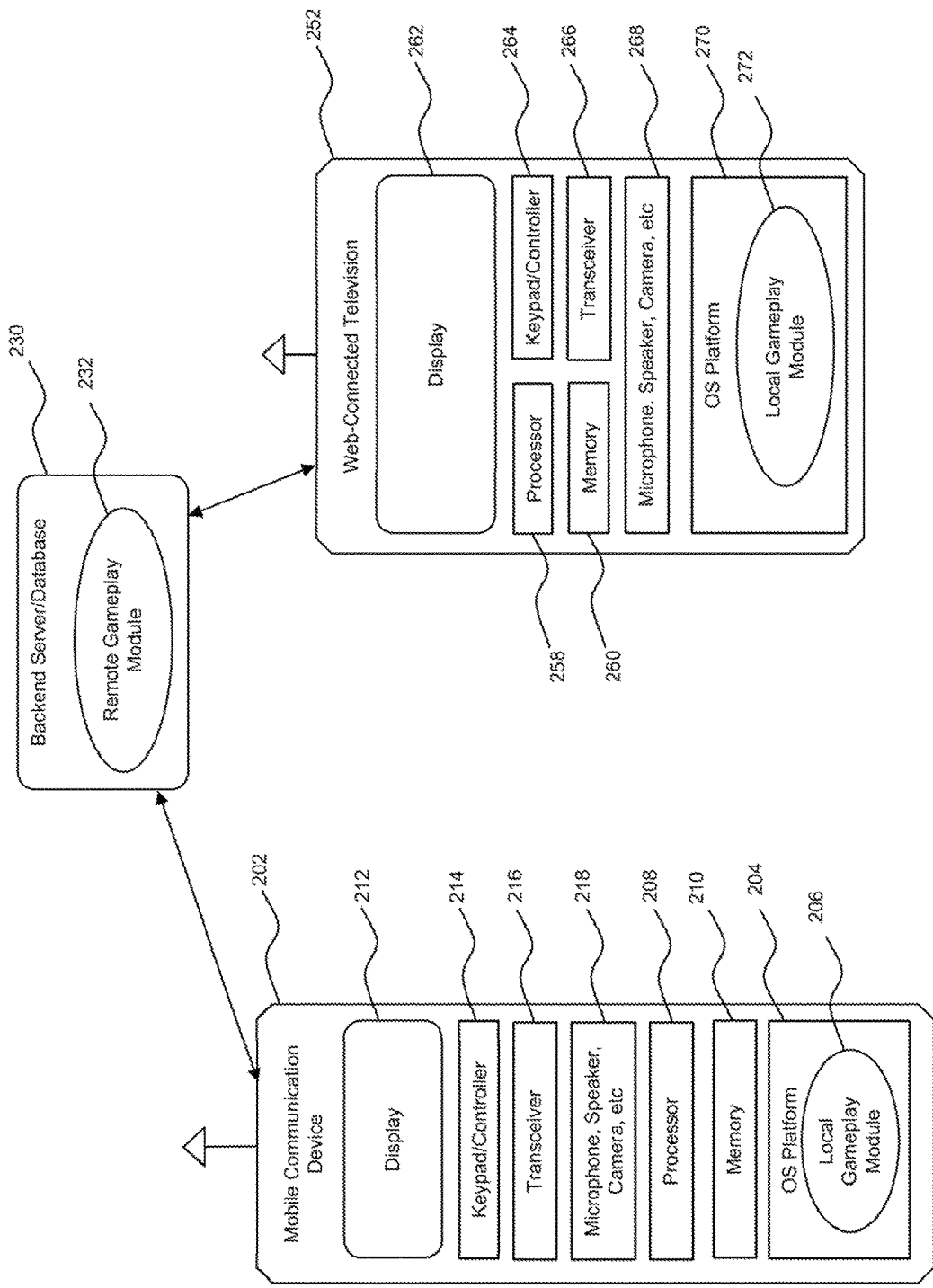
FIG. 2 is a block diagram that illustrates how context sensitive native gameplay experience is provided across mobile and connected platforms, in accordance with an embodiment of the disclosure.

FIG. 2 is a block diagram that illustrates how context sensitive native gameplay experience is provided across mobile and connected platforms, in accordance with an embodiment of the disclosure. Referring to FIG. 2, there is shown a mobile communication device 202, a backend server/database 230 and a web-connected TV 252. The mobile communication device 202 includes an operating system (OS) platform 204, a processor 208, memory 210, display 212, keypad controller 214 and a transceiver 216. The OS platform 204 includes a local gameplay module 206. The mobile communication device 202 may also include a microphone, speaker and a camera, which are collectively referenced as devices 218. The web-connected television 252 may include an operating system (OS) platform 270, a processor 258, memory 260, display 262, keypad controller 264 and a transceiver 266. The OS platform 270 includes a local gameplay module 272. The web-connected television 252 may also include a microphone, speaker and a camera, which are collectively referenced as devices 268.

The mobile communication device 202 may include suitable logic circuitry, interfaces and/or code that may be operable to communicate utilizing one or more wired and/or wireless technologies. In an example embodiment of the disclosure, the mobile communication device 202 may communicate wirelessly utilizing 802.11a/b/g/n/e, 802.16, 3G, 4G, and Bluetooth. In one embodiment of the disclosure, the mobile communication device 202 may include a smartphone. The mobile communication device 202 may include an OS platform 204 that is operable to provide context sensitive native gameplay experience across mobile and connected platforms.

The OS platform 204 may include suitable logic, interfaces and/or code that may be operable to control operation of the mobile communication device 202. For example, the OS platform 204 may enable a user to interact with mobile communication device 202 and to run or execute applications and play games. The OS platform 204 may include a local gameplay module 206.

The local gameplay module 206 is integrated as part of the OS platform 204 and may include suitable logic, interfaces and/or code that may be operable to provide context sensitive native gameplay experience across mobile and connected platforms. The gameplay module 206 is not an application that runs on the operating system platform 204, but instead, is integrated as part of the operating system platform 204. In an example embodiment of the disclosure, the local gameplay module 206 may enable a user of the mobile communication device 202 to publish a game written for the mobile communication device 202 to the Cloud 112, such that when the user installs the game on the mobile communication device 202, the game is also compatibly installed to the user's web browser, and other devices such as the web connected television 252 and the tablet 106. In one embodiment of the disclosure, the local gameplay module 206 may include a software development kit (SDK).

The publication of the game to the Cloud 112 for use across the web-browser and other devices such as the web connected television 252 and the tablet 106 may include conversion of the game content to different screen resolutions that are compatible with the corresponding characteristics of the web browser and/or other devices that the game is being installed on. For example, when the game is being installed on the mobile communication device 202, which may be a smartphone, the publication of the game to the Cloud 112 may include converting the game content to fit on the bigger screen of the web connected television 252 and also to fit on the screen of the tablet 106. Since the audio capability of the tablet 106 may be similar to that of the mobile communication device 202, the latter of which may be a smartphone, there may be no need to covert the corresponding audio content for the game for playback on the tablet 106. However, since the audio capability of the web-connected television 252 may be more sophisticated than the mobile communication device 202, the corresponding audio for the game may be converted using more advanced or sophisticated audio codecs. For example, if it is determined that the web-connected television 252 is able to handle 3D audio, then the audio content for the game may be converted to 3D audio for playback on the web-connected TV 252.

The publication of the game, by the local gameplay module 206, to the Cloud 112 for use across the web-browser and other devices such as the web connected television 252 and the tablet 106 may include generating a standardized or normalized set of input/output (I/O) controls. In this regard, I/O controls such as touch, keyboard, mouse, control/game pad, remote control, may be converted to a standardized or normalized format that represents the same functions or action on all the devices such as the mobile communication device 202, the web-connected television 252 and the tablet. More generally, I/O controls may be normalized such that an OS on a particular device receives a generic set of normalized instructions, which are then translated to specific instructions for the receiving platform. The normalized, generic instructions may be generated by the Cloud, an application server, or other backend server/database as disclosed herein.

During gameplay, the local gameplay module 206 may be operable to save gameplay data in a serialized format. Gameplay data may be stored locally on the mobile communication device 202, for example, in the memory 210. Gameplay data may also copied from the mobile communication device 202 and stored remotely in the backend server/database 230. In this regard, snapshots of the gameplay may be taken and corresponding data may be stored locally or remotely.

The local gameplay module 206 may be operable to record unfinished gameplay and finished gameplay sessions. For finished gameplay sessions, the local gameplay module 206 may copy local gameplay data, which was not previously copied, to the backend server database 230. The remote gameplay module 232 may be operable to consolidate all the corresponding data for a finished gameplay session. For unfinished gameplay sessions, the new device that will be handling a gameplay session may be operable to acquire up-to-date gameplay data from one or both of the local gameplay module 206 and the remote gameplay module 232.

The processor 208 may include suitable logic, circuitry, interfaces, and/or code that may be operable to execute code or otherwise control operation of the mobile communication device 202. For example, the processor 208 may be operable to control the OS platform 204, the gameplay monitor 206, the memory 210, the display 212, and the keypad/controller 214. In accordance with various embodiments of the disclosure, the processor 208 may be operable to handle operations of the gameplay monitor 206, which may be utilized to provide context sensitive native gameplay experience across mobile and connected platforms or devices.

The memory 210 may include suitable logic, circuitry, interfaces, and/or code that may be operable to store operating and temporary data for the mobile communication device 202. For example, the memory 210 may be enabled to store configurations and operating data for the mobile communication device 202. The memory 210 may be operable to store OS platform information and data, as well as data utilized by the gameplay monitor 206 for detecting gameplay moments. In instances when the web-connected television 252 senses or discovers, for example, via Bluetooth, that the mobile communication device 202 is within range, and that there is an unfinished gameplay session in progress, the web-connected television 252 may be operable to acquire updated data for the unfinished gameplay session from one or both of the local gameplay module 206 and the remote gameplay module 232. In instances when the local gameplay module 206 may not have provided updated information for the unfinished gameplay session to the backend server/database 230, the web-connected television 252 may acquire gameplay data from both the local gameplay module 206 and the remote gameplay module 232. As a result, when the web-connected television 252 takes over the unfinished gameplay session, the playing of the game on the web-connected device 252 occurs in a seemless manner as the experience is the same with input and output differences accounted for.

The display 212 may include suitable logic, circuitry, interfaces, and/or code that may be operable to display a user interface that enables a user to interact with the mobile communication device 202. For example, the display 212 may be utilized to configure the mobile communication device 202 as well as provide user interaction when playing a game. In this regard, the display 212 may provide visual and/or touch interaction for the mobile communication device 202. The display 212 may include LED, LCD or variants thereof.

The keypad controller 214 may include suitable logic, circuitry, interfaces, and/or code that may be operable to control and manipulate the communication device 202. In this regard, the keypad controller 214 may be utilized to control applications such as games, which may be running on the communication device 202. The keypad controller 214 may include a physical set of keys or buttons, and/or a software generated set of keys.

The transceiver 216 may include suitable logic, circuitry, interfaces, and/or code that may be operable to wireless communication for the mobile communication device 202. For example, the transceiver 216 may be operable to handle wireless technologies such as 802.11a/b/g/n/e, 802.16, 3G, 4G, and Bluetooth. Although a single transceiver is shown, there may be a plurality of transceivers to handle a plurality of wireless communication technologies.

The mobile communication device 202 may also include a microphone, speaker and a camera, which are collectively referenced as devices 218. The microphone and camera 218 may be operable to capture video and/or corresponding audio that may be associated with a gameplay session. The speaker may be utilized to play audio. In instances where the mobile communication device 202 is a smartphone, the microphone, speaker and/or camera 218 may be integrated as part of the smartphone.

The backend server/database 230 may include suitable logic circuitry, interfaces and/or code that may be operable to run a remote gameplay module 232 that corresponds to the local gameplay module 206, the latter of which is part of the OS platform 204. The backend server/database 230 may be operable to store gameplay data that corresponds to finished gameplay sessions and unfinished gameplay sessions. The gameplay monitor 206 may be operable to store gameplay data locally within the mobile communicate device 202 and then, periodically or aperiodically, copy the locally stored gameplay data to the backend server/database 230. The remote gameplay module 232 may be operable to handle consolidation of data for a particular gameplay session.

The web-connected television 252 may include suitable logic circuitry, interfaces and/or code that may be operable to communicate utilizing one or more wired and/or wireless technologies. In an example embodiment of the disclosure, the web-connected television 252 may communicate wirelessly utilizing 802.11a/b/g/n/e, 802.16, 3G, 4G, and Bluetooth. In another example embodiment of the disclosure, the communication device 202 may communicate using wired technology such as Ethernet. In one embodiment of the disclosure, the web-connected television 252 may include a smart television or smart TV. The web-connected television 252 may include an OS platform 270 that is operable to provide context sensitive native gameplay experience across mobile and connected platforms.

The OS platform 270 may include suitable logic, interfaces and/or code that may be operable to control operation of the web-connected television 252. For example, the OS platform 270 may enable a user to interact with web-connected television 252 and to run or execute applications and play games. The OS platform 270 may include a local gameplay module 272. The local gameplay module 272 is integrated as part of the OS platform 270 and may include suitable logic, interfaces and/or code that may be operable to provide context sensitive native gameplay experience across mobile and connected platforms. The local gameplay module 272 is not an application that runs on the operating system platform 270, but instead, is integrated as part of the operating system platform 270. In an example embodiment of the disclosure, the local gameplay module 272 may enable a user of the web-connected television 252 to publish a game written for the web-connected television 252 to the Cloud 112, such that when the user installs the game on the web-connected television 252, the game is also compatibly installed to the user's web browser, and other devices such as the mobile communication device 202 and the tablet 106. In one embodiment of the disclosure, the local gameplay module 272 may include a software development kit (SDK). The OS platform 270 and the local gameplay module 272 operates in a manner that is similar to the operation of the OS platform 204 and the local gameplay module 206 in the mobile communication device 202.

The processor 258 may include suitable logic, circuitry, interfaces, and/or code that may be operable to execute code or otherwise control operation of the web-connected television 252. For example, the processor 258 may be operable to control the OS platform 270, the gameplay monitor 272, the memory 260, the display 262, and the keypad/controller 264. In accordance with various embodiments of the disclosure, the processor 258 may be operable to handle operations of the local gameplay monitor 272, which may be utilized to provide context sensitive native gameplay experience across mobile and connected platforms or devices.

The memory 260 may include suitable logic, circuitry, interfaces, and/or code that may be operable to store operating and temporary data for the web-connected television 252. For example, the memory 260 may be enabled to store configurations and operating data for the web-connected television 252. The memory 260 may be operable to store OS platform information and data, as well as data utilized by the local gameplay module 272 to provide context sensitive gameplay experience across mobile and connected platforms or devices.

The display 262 may include suitable logic, circuitry, interfaces, and/or code that may be operable to display a user interface that enables a user to interact with the web-connected television 252. For example, the display 262 may be utilized to configure the web-connected television 252 as well as provide user interaction when playing a game. In this regard, the display 262 may provide visual and/or touch interaction for the web-connected television 252. The display 262 may include LED, LCD or variants thereof.

The keypad controller 264 may include suitable logic, circuitry, interfaces, and/or code that may be operable to control and manipulate the web-connected television 252. In this regard, the keypad controller 264 may be utilized to control applications such as games, which may be running on the web-connected television 252. The keypad controller 264 may include a physical set of keys or buttons, and/or a software generated set of keys.

The transceiver 266 may include suitable logic, circuitry, interfaces, and/or code that may be operable to handle wired and/or wireless communication for the web-connected television 252. For example, the transceiver 266 may be operable to handle wireless technologies such as 802.11a/b/g/n/e, 802.16, 3G, 4G, Bluetooth and wired technologies such as Ethernet. Although a single transceiver 266 is shown, there may be a plurality of transceivers to handle a plurality of wired and wireless communication technologies.

The web-connected television 252 may also include a microphone, speaker and a camera, which are collectively referenced as devices 268. The microphone and camera 268 may be operable to capture video and/or corresponding audio that may be associated with a gameplay session. The speaker may be utilized to play audio. In instances where the communication device 202 is a smartphone, the microphone, speaker and/or camera 218 may be integrated as part of the smartphone. For the web-connected television 252, one or more of the microphone, the speaker and the camera 268 may be a peripheral device that may be coupled to the web-connected television 252. For example, the microphone and speaker may be integrated in the web-connected television 252 and the camera may be an externally coupled device.

In operation, a user may be currently engaged in a gameplay session on the mobile communication device 202. When the mobile communication device 202 is brought within connection range of the web-connected television 252, the web-connected television 252 may be operable to connect with the mobile communication device 202 using, for example, Bluetooth. Once the web-connected television 252 is connected to the mobile communication device 202, the web-connected television 252 may transfer corresponding gameplay data for the current gameplay session. If the web-connected television 252 determines that the user has not terminated their gameplay session, the web-connected television 252 may run the game application including turning on any attached device such as a display and speakers and load gameplay up until the last user action recorded to the smartphone. The web-connected television 252 may also be operable to transfer gameplay data from the backend server/database 230 as need in order to seamlessly resume gameplay utilizing its own resources.

In accordance with an embodiment of the disclosure, the web-connected television 252 may be operable to poll for devices that are within operating vicinity. The disclosure is not limited to the use of Bluetooth. Accordingly, other wireless communication technology such as PAN, LAN and NFC may be utilized. In this regard, other method of determining contextual awareness may include using, for example, GPS, WiFi, ZigBee, signal strength, near-field communication or docking.

Figure 3:
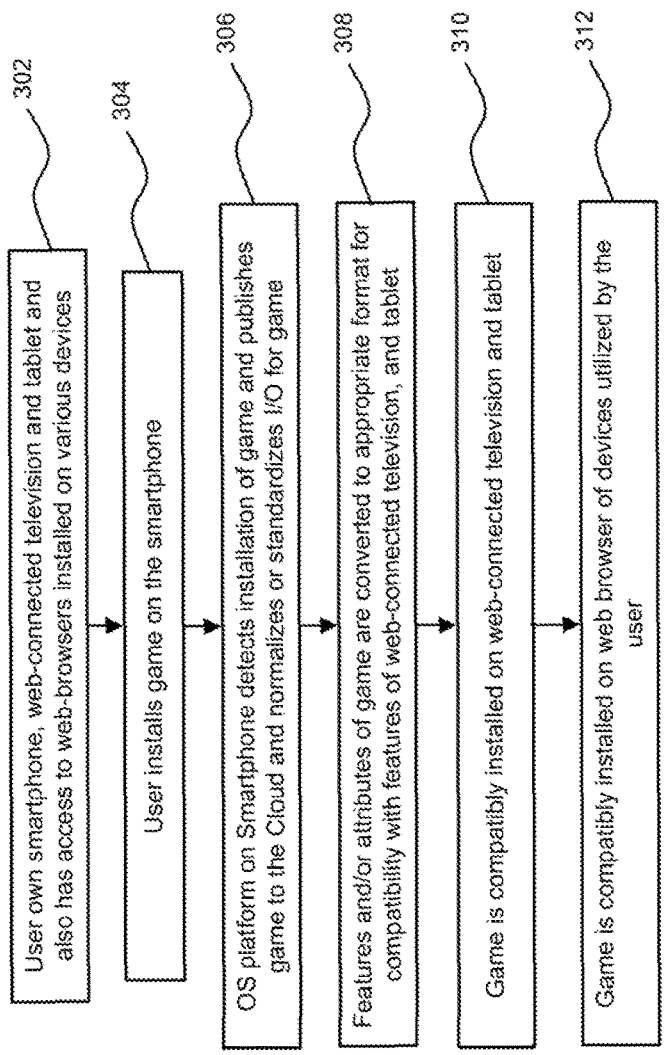
FIG. 3 is a flow chart illustrating example steps for context sensitive native gameplay experience across mobile and connected devices, in accordance with an embodiment of the disclosure.

FIG. 3 is a flow chart illustrating example steps for publication of a game to provide context sensitive native gameplay experience across mobile and connected devices, in accordance with an embodiment of the disclosure. Referring to FIG. 3, in step 302, a user owns a smartphone, a web-connected television, a tablet and also has access to web-browsers installed on various devices. In step 304, the user installs a game on the smartphone. In step 306, the OS platform for the smartphone detects the installation of the game and publishes the game to the Cloud and normalizes or standardizes the I/O for the game. In step 308, modules and/or attributes of the games are converted to appropriate format for compatibility with the modules of the web-connected television and tablet. In step 310, the game is compatibly installed on the web-connected television and the tablet. In step 312, the game is also compatibly installed on the web-browser of devices utilized by the user.

Figure 4:
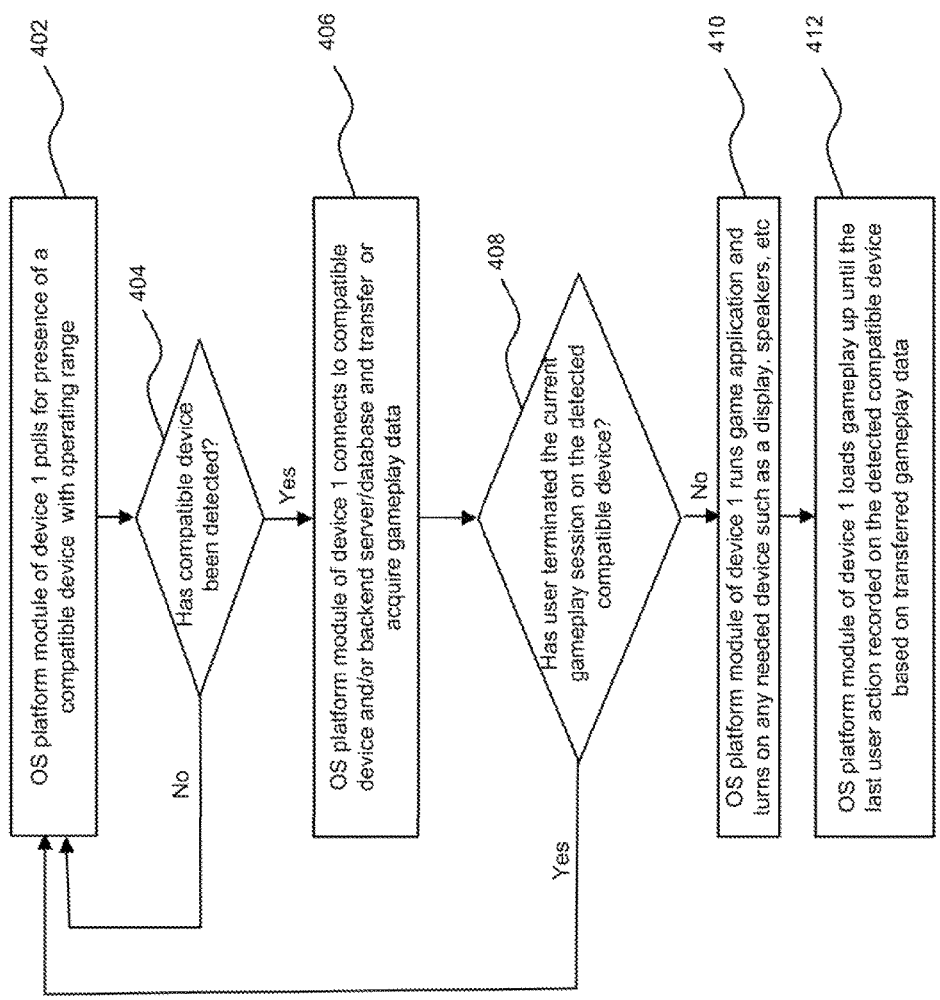
FIG. 4 is a flow chart illustrating example steps for context sensitive native gameplay experience across mobile and connected devices, in accordance with an embodiment of the disclosure.

FIG. 4 is a flow chart illustrating example steps for context sensitive native gameplay experience across mobile and connected devices, in accordance with an embodiment of the disclosure. Referring to FIG. 4, in step 402, the OS platform module of device 1 polls for the presence of a compatible device within operating range. For example, the OS platform module of a web-connected television 104 may poll for the presence of a compatible device such as the mobile communication device 102 or the tablet 106 within range. In step 404, the OS platform module of the device 1 may determine whether a compatible device has been detected. If in step 404, a compatible device has been detected, then in step 406, the OS platform module of the device 1 may connect to the compatible device and/or to the backend/database and transfer or acquire gameplay data for the game. In step 408, the OS platform module of the device 1 may determine whether the user has terminated the current gameplay session on the detected compatible device. In step 410, the OS platform module of the device 1 may run the game application and turn on any needed device such as a display, speakers, etc. In step 412, the OS platform module of device 1 loads gameplay up until the last user action recorded on the detected compatible device based on the transferred gameplay data.

In various embodiments of the disclosure, an operating system platform-level gaming module or feature 206 that is integrated as part of an operating system (OS) platform 204 for a first wired and/or wireless communication device 202 is operable to detect when a user installs a game written for the first wired and/or wireless communication device 202. The operating system platform-level gaming module 206 is operable to publish the game to a Cloud 112 when the installation of the game is detected. The operating system platform-level gaming module 206 enables installation of the published game to at least a second wired and/or wireless communication device that is associated with the user. For illustrative purposes the first wired and/or wireless communication device may include the mobile communication device 202 and the second wired and/or wireless communication device may include the web-connected television 252. The operating system platform-level gaming module or feature may also be referred to as the local gameplay module.

The operating system platform-level gaming module 206 may be operable to copy corresponding configurations and settings for the game installed on the first wired and/or wireless communication device 202 to the Cloud 112. The operating system platform-level gaming module 206 may be operable to update the copied corresponding configurations and settings for the game whenever there is a change to one or more of the corresponding configurations and settings for the game installed on the first wired and/or wireless communication device 202 to the Cloud 112. The operating system platform-level gaming module 206 may be operable to generate one or more methods that enable conversion of corresponding content for the game to one or more different resolutions compatible with the first wired and/or wireless communication device 202 and at least the second wired and/or wireless communication device 252. The one or more different resolutions include visual resolution such as display resolution and/or audio content resolution such as different bit rates or formats.

The operating system platform-level gaming module 206 may be operable to generate one or more methods that enable normalization of input for controlling the game on the first wired and/or wireless communication device 202 and at least the second wired and/or wireless communication device 252. The operating system platform-level gaming module 206 may be operable to save, in a serialized format, gameplay data associated with playing of the game on the first wired and/or wireless communication device 202. The saving may occur on one or both of the first wired and/or wireless communication device 202 and/or may occur remotely in the Cloud 112. The operating system platform-level gaming module 206 may be operable to communicate the gameplay data from one or both of the Cloud 112 and the first wired and/or wireless communication device to at least the second wired and/or wireless communication device 252 that is associated with the user.

The operating system platform-level gaming module 206 may be operable to record at least a portion of one or both of finished and unfinished gameplay sessions for the game. When the game is running on the first wired and/or wireless communication device 202 and the first wired and/or wireless communication device 202 comes within operating range of the second wired and/or wireless communication device 252, an operating system platform-level gaming module 272 on the second wired and/or wireless communication device 252 may be operable to transfer gameplay configurations and settings to the second wired and/or wireless communication device 252.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatic sharing of engaging gameplay moments from a mobile device.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which includes all the modules enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, the method comprising:
   in an operating system platform-level gaming module that is integrated as part of an operating system (OS) platform that executes on a first wired and/or wireless communication device:
      detecting when a user installs a game written for said first wired and/or wireless communication device;
      publishing said game to a cloud when said installation of said game is detected, wherein said operating system platform-level gaming module enables installation of said published game to at least a second wired and/or wireless communication device that is associated with said user;
      generating, by said operating system platform-level gaming module, one or more methods that enable conversion of corresponding content for said game to one or more different resolutions compatible with said first wired and/or wireless communication device and said second wired and/or wireless communication device; and
      generating, by said operating system platform-level gaming module, one or more methods that enable normalization of input for controlling said game on said first wired and/or wireless communication device and said at least said second wired and/or wireless communication device.

2. The method according to claim 1, comprising copying, by said operating system platform-level gaming module, corresponding configurations and settings for said game installed on said first wired and/or wireless communication device to said cloud.

3. The method according to claim 2, comprising updating, by said operating system platform-level gaming module, said copied corresponding configurations and settings for said game whenever there is a change to one or more of said corresponding configurations and settings for said game installed on said first wired and/or wireless communication device to said cloud.

4. The method according to claim 1, wherein said one or more different resolutions comprise visual and/or audio content resolutions.

5. The method according to claim 1, comprising
   saving, by said operating system platform-level gaming module, in a serialized format, gameplay data associated with playing of said game on said first wired and/or wireless communication device, wherein said saving occurs on said first wired and/or wireless communication device and/or remotely in a cloud.

6. The method according to claim 5, comprising communicating, by said operating system platform-level gaming module, said gameplay data from one or both of said cloud and said first wired and/or wireless communication device to said at least said second wired and/or wireless communication device that is associated with said user.

7. The method according to claim 1, comprising recording, by said operating system platform-level gaming module, at least a portion of one or both of finished and unfinished gameplay sessions for said game.

8. The method according to claim 1, wherein, when said game is running on said first wired and/or wireless communication device and said first wired and/or wireless communication device comes within operating ranges of said second wired and/or wireless communication device, an operating system platform-level gaming module of said second wired and/or wireless communication device is operable to transfer gameplay configurations and settings to said second wired and/or wireless communication device.

9. The method according to claim 1, comprising
   saving, by said operating system platform-level gaming module, in a serialized format, gameplay data associated with playing of said game on said first wired and/or wireless communication device, wherein said saving occurs on said first wired and/or wireless communication device and/or remotely in a cloud; and
   communicating, by said operating system platform-level gaming module, said gameplay data from said first wired and/or wireless communication device to said at least said second wired and/or wireless communication device that is associated with said user.

10. A system, the system comprising:
   a wired and/or wireless communication device comprising a processor and an operating system platform operable to provide wired and/or wireless communication, and gaming, said at least one processor in the wired and/or wireless communication device being operable to execute an operating system platform-level gaming module that is integrated as part of said operating system platform to:

detect when a user installs a game written for said first wired and/or wireless communication device;

publish said game to a cloud when said installation of said game is detected, wherein said operating system platform-level gaming module enables installation of said published game to at least a second wired and/or wireless communication device that is associated with said user;

generate one or more methods that enable conversion of corresponding content for said game to one or more different resolutions compatible with said first wired and/or wireless communication device and said at least said second wired and/or wireless communication device; and generate one or more methods that enable normalization of input for controlling said game on said first wired and/or wireless communication device and said at least said second wired and/or wireless communication device.

11. The system according to claim 10, wherein said at least one processor is operable to execute said operating system platform-level gaming module to copy corresponding configurations and settings for said game installed on said first wired and/or wireless communication device to said cloud.

12. The system according to claim 11, wherein said at least one processor is operable to execute said operating system platform-level gaming module to update said copied corresponding configurations and settings for said game whenever there is a change to one or more of said corresponding configurations and settings for said game installed on said first wired and/or wireless communication device to said cloud.

13. The system according to claim 10, wherein said one or more different resolutions include visual and/or audio content resolutions.

14. The system according to claim 10, wherein said at least one processor is operable to execute said operating system platform-level gaming module to generate one or more methods that enable normalization of input for controlling said game on said first wired and/or wireless communication device and said at least said second wired and/or wireless communication device.

15. The system according to claim 10, wherein said at least one processor is operable to execute said operating system platform-level gaming module to save, in a serialized format, gameplay data associated with playing of said game on said first wired and/or wireless communication device, wherein said saving occurs on said first wired and/or wireless communication device and/or remotely in a cloud.

16. The system according to claim 15, wherein said at least one processor is operable to execute said operating system platform-level gaming module to communicate said gameplay data from one or both of said cloud and said first wired and/or wireless communication device to said at least said second wired and/or wireless communication device that is associated with said user.

17. The system according to claim 10, wherein said at least one processor is operable to execute said operating system platform-level gaming module to record at least a portion of one or both of finished and unfinished gameplay sessions for said game.

18. The system according to claim 10, wherein, when said game is running on said first wired and/or wireless communication device and said first wired and/or wireless communication device comes within operating ranges of said second wired and/or wireless communication device, an operating system platform-level gaming module of said second wired and/or wireless communication device is operable to transfer gameplay configurations and settings to said second wired and/or wireless communication device.

19. The system according to claim 10,
wherein said at least one processor is operable to execute said operating system platform-level gaming module to save, in a serialized format, gameplay data associated with playing of said game on said first wired and/or wireless communication device, wherein said saving occurs on said first wired and/or wireless communication device and/or remotely in a cloud, and wherein said at least one processor is operable to execute said operating system platform-level gaming module to communicate said gameplay data from said first wired and/or wireless communication device to said at least said second wired and/or wireless communication device that is associated with said user.

* * * * *